No. 858,994. PATENTED JULY 2, 1907.
F. KRAHENBUHL.
SAW SET.
APPLICATION FILED APR. 10, 1906.
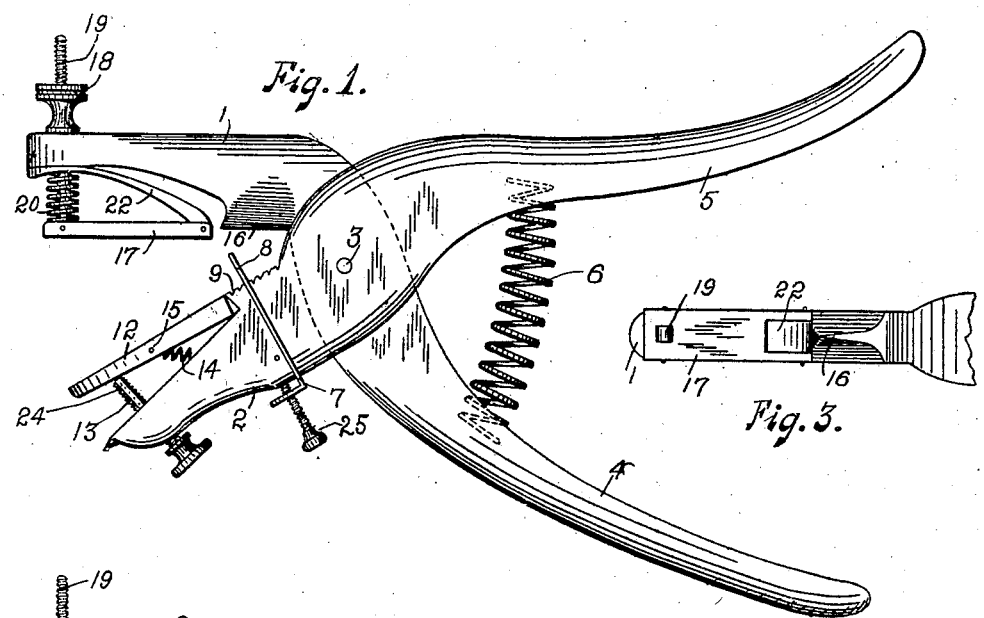
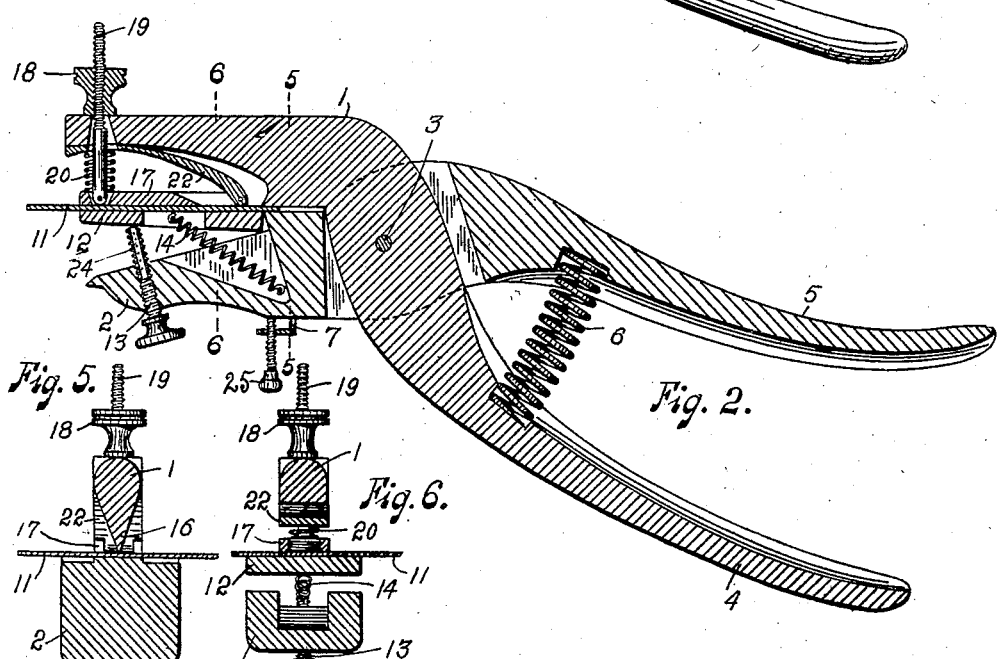
WITNESSES:
INVENTOR.
F. Krahenbuhl,
BY
ATTORNEY.

UNITED STATES PATENT OFFICE.

FRED KRAHENBUHL, OF SAN FRANCISCO, CALIFORNIA.

SAW-SET.

No. 858,994.    Specification of Letters Patent.    Patented July 2, 1907.

Application filed April 10, 1906. Serial No. 310,921.

*To all whom it may concern:*

Be it known that I, FRED KRAHENBUHL, a citizen of Switzerland, residing at San Francisco, in the county of San Francisco and State of California, have invented certain new and useful Improvements in Saw-Sets, of which the following is a specification.

This invention relates to improvements in saw sets, the object of the invention being to provide a saw set which can be used equally well for setting saws either with fine or with large teeth.

In the accompanying drawing, Figure 1 is a side elevation of my improved saw set, open; Fig. 2 is a longitudinal section of the same closed upon a saw; Fig. 3 is a bottom plan view of the upper jaw; Fig. 4 is a top plan view of the lower jaw; Fig. 5 is a cross section on the line 5—5 of Fig. 2; Fig. 6 is a cross section on the line 6—6 of Fig. 2.

Referring to the drawing, 1 represents the upper jaw and 2 the lower jaw of the saw set, said jaws being pivoted at 3 and having handles 4, 5, pressed apart by a spring 6. Around the lower jaw extends a yoke 7, having lips 8 adapted to enter any one of a series of pairs of grooves 9, formed upon the upper surface of the lower jaw, the grooves of each pair lying on opposite sides of a smooth surface 10 of said jaw upon which rests the tooth of the saw 11 to be set. Said lips are secured in place by a screw 25. The saw itself then rests upon a lower clamping plate 12, the inner end of which rests upon the jaw 2, while its outer end is adjusted by a screw 13 so as to give to the blade of the saw the desired angle relative to the teeth. This plate is normally drawn down by means of a stretched spring 14 attached at one end to the lower jaw and at the other end to a cross pin 15 secured across a hole in said plate. The adjusting screw 13 holds up said plate against the tension of the spring.

The upper jaw has a sharp edge 16 which extends over the surface 10 of the lower jaw, so that when the jaws are brought together, said edge descends upon said tooth, and holds it firmly upon the surface 10. At the same time an upper clamping plate 17 carried by the upper jaw descends upon the lower clamping plate 12 and clamps the blade of the jaw between said plates. The position of said plate relatively to the upper jaw is adjusted by a nut 18 screwed on a threaded rod 19 passing loosely through the end of the upper jaw, the lower end of the rod being pivoted to the outer end of the clamping plate 17. A coiled spring 20 around said rod and compressed between the outer end of the upper jaw and the end of the upper clamping plate serves to depress the outer end of said clamping plate when the nut is screwed up on the threaded rod, while by screwing the nut down upon said rod the outer end of said clamping plate is drawn upwards against the spring. At the same time the inner end of said clamping plate is pressed down by means of a strong plate spring 22 pivotally secured to said inner end and also to the outer end of the upper jaw. This plate spring permits the inner end of the upper clamping plate to yield so as to adjust the inclination of the upper clamping plate to that of the lower, so that the two clamping plates can grasp the blade of the saw firmly along their whole lengths.

For the purpose of determining the angle of inclination which has been given to the lower clamping plate the lower adjusting screw is flattened on one side, as shown at 24, so as to carry index marks to indicate the amount of elevation of the outer end of the lower clamping plate.

The operation of the device is therefore as follows:— The lower clamping plate is adjusted by its adjusting screw until it makes the desired angle of inclination to the part of the lower jaw upon which the tooth rests. Then the clamping plate of the upper jaw is adjusted accordingly, bearing in mind the thickness of the saw which is to be operated upon, so that the upper clamping plate will lie as nearly as possible parallel with the lower clamping plate. At the same time the yoke 7 is adjusted in the pair of grooves which corresponds with the depth of the teeth of the saw. The saw is now inserted so that the teeth thereof will abut against the yoke so adjusted, and the tooth that is to be set is placed on the surface 10 in position to be depressed by the sharp edge 16 of the upper jaw. The jaws are then closed. The clamping plates come together, clamping the blade of the saw and holding it firm at the given angle, and at the same time the sharp edge 16 bears down on the tooth of the saw and bends it to the desired set. The handles are then opened, the saw is moved forward to bring the next tooth into the same place and the operation is repeated.

The important features of my invention I consider to be, first, the lower clamping plate, the outer end of which is adjustable to give the plate any desired slope to the bearing surface 10; second, the upper clamping plate connected at the inner end to the upper jaw to bear down upon the saw blade and clamp it against the lower clamping jaw with an even pressure throughout its whole length; third, the support for the teeth when they are being set, this solid support furnishing a good grasp for the teeth while at the same time the blade itself is held by the clamping plates; fourth, the series of grooves and the yoke adjustably secured therein for placing the saw teeth in the proper position to be operated upon.

I claim:—

1. A saw set having jaws provided with means for bending a tooth, one of said jaws having a clamping plate, a plate spring connecting the inner end of said plate with the jaw, and a yielding connection for adjustably securing to the jaw the other end of the clamping plate, substantially as described.

2. A saw set having jaws formed with unyielding surfaces adapted to hold a tooth of a saw, and having clamping plates for clamping the saw blade, said clamping plates being independently angularly adjustable relatively to the jaws and resilient supports for the ends of one of said plates, substantially as described.

In witness whereof I have hereunto set my hand in the presence of two subscribing witnesses.

FRED KRAHENBUHL.

Witnesses:
BESSIE GORFINKEL,
HAZEL RIVERS.